Dec. 22, 1942. G. HANSEN 2,305,778
OPTICAL SYSTEM FOR SPECTRAL APPARATUS
Filed Dec. 27, 1940

Inventor:

Patented Dec. 22, 1942

2,305,778

UNITED STATES PATENT OFFICE 2,305,778

OPTICAL SYSTEM FOR SPECTRAL APPARATUS

Gerhard Hansen, Jena, Germany; vested in the Alien Property Custodian

Application December 27, 1940, Serial No. 371,928
In Germany December 11, 1939

3 Claims. (Cl. 88—14)

Application has been filed in Germany, December 11, 1939.

The invention relates to an optical system for spectral apparatus comprising two lens systems, a dispersion system lying between said two lens systems and an autocollimation mirror which, for the purpose of changing over in the use of the apparatus from the single passage of light to autocollimation, can be brought from one of two positions into the other, i. e., into the working position, where it lies between the said two lens systems and where it reflects the light which has passed through the one lens system and through the dispersion system in such a manner that the light is made to pass through said two systems a second time.

According to the invention an optical system as described is provided with a reflector system defining the path of the rays, the reflector system causing the light in either of the two applications of the apparatus to be conducted to one and the same destination, i. e., either to one and the same light-emerging slit, or to one and the same photographic layer, said reflector system containing reflectors in fixed position acting upon the full pencil of light conducted to them, and also a reflector of the light-separating type, either in a fixed position or so disposed that it can be swung in or out of the way of the light rays.

The working position the autocollimating reflector is recommended to occupy relative to the other parts of the optical system is such that the reflecting surface of said reflector is about perpendicular to the axial light-ray.

A suitable optical system according to the invention is obtained if provision is made for two adjacent light-entering slits to be separately exposed to light and one of which is to be used when the apparatus is employed for the single passage of light, while the other is intended to be used when the apparatus is employed for autocollimation the position of the two light-entering slits relative to the elements of the optical system being such that the light emitted from the one slit is conveyed to the one and the light emitted from the other slit to the other of the two lens systems.

Figures 1, 2:
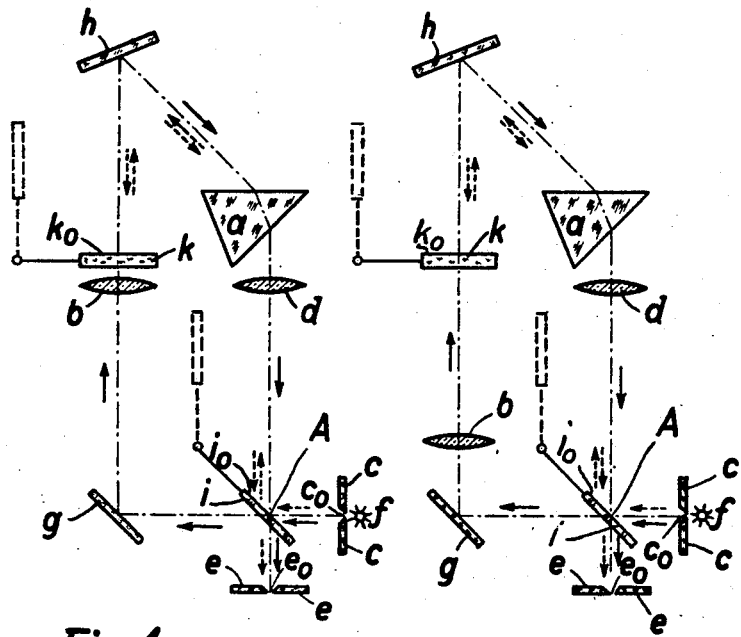
Figure 3:
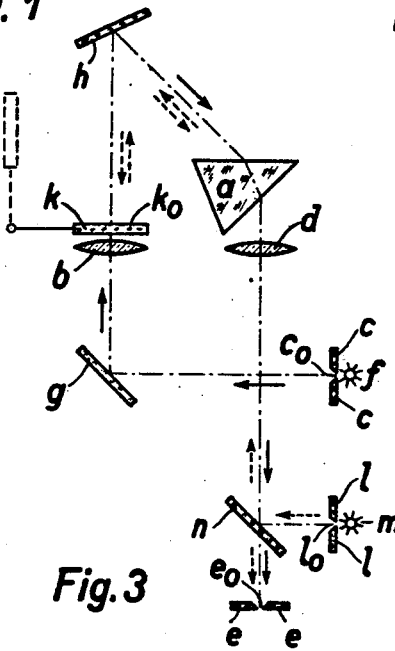

In Figs. 1 to 3 of the annexed drawing three diagrammatic illustrations are given of optical systems of a spectral apparatus according to the invention.

To the prism $a$ of the optical system shown in Fig. 1 two collimators are coordinated one of which has a lens $b$ and a slit $c_0$ formed by two jaws $c$, and the other a lens $d$ and a slit $e_0$ formed by two jaws $e$. The lenses $b$ and $d$ are of different focal lengths. The slit $c_0$ is the light-entering slit to which a light-source $f$ is co-ordinated. A reflector $g$ serves for deviating the optic axis of the collimator $b$, $c_0$ by 90°, while a reflector $h$ serves to again deviate the deviated part of the optic axis until, after a further deviation through prism $a$ said part of the optic axis coincides with the axis of the collimator $d$, $e_0$. Those two parts of the optic axis containing the slit $c_0$, and slit $e_0$, respectively, intersect each other at a point A at right angles. The letter $i$ designates a swing-in and out reflector which is so disposed that, when swung-in, it occupies the position indicated in the drawing by the full lines i. e., where its reflecting surface $i_0$ is parallel to that of the reflector $g$ and where it contains said intersecting point A. The reflector $i$ is bounded by the plane containing the optic axes of the lenses $b$ and $d$, so that it can reflect only light rays lying to one side of said plane. A second swing-in and out reflector $k$ when swung-in occupies the position indicated in the drawing by the full lines and where its reflecting surface $k_0$ is at right angles to the optic axis.

When the reflectors $i$ and $k$ are in swung-out position the rays emanating from light-source $f$ run in the direction of the fully drawn arrows for single passage of light, while after interposing these reflectors into the light-path the rays run as indicated by the broken arrows showing that the apparatus works on the autocollimation principle.

The constructional example according to Fig. 2 differs from Fig. 1 merely by the lens $b$ occupying another position which is determined by the equality of the focal lengths of the lenses $b$ and $d$.

The constructional example according to Fig. 3 differs from that shown in Fig. 1 by the focal lengths of lenses $b$ and $d$ being equal to one another without their position being changed relative to prism $a$. This necessitates the provision of a second light-entering slit $l_0$ which is formed by the two jaws $l$. To this slit $l_0$ a light-source $m$ is coordinated. That part of the optic axis containing the slit $l_0$ is so deviated by a reflector $n$ whose reflecting surface is parallel to that of the reflector $g$, that after its deviation it coincides with that part of the optic axis containing the light-emanating slit $e_0$. The reflector $n$ is bounded by the plane containing the optic axes of the lenses $b$ and $d$, so that it can reflect only light rays lying to one side of said plane. The swing-in and out reflector $i$ has been dispensed with.

If the apparatus is intended to be used for single passage of light, the light-source $f$ is required to be active and the reflector $k$ swung-out, whereas if the autocollimation principle is to be employed the reflector $k$ must be swung-in, with the light-source $m$ being active.

I claim:

1. In an optical system for spectral apparatus which are to be used for single passages of light as well as for autocollimation, two lens systems adapted to produce of a light spot which coincides with the focal point of one of said lens systems an image coinciding with the focal point of the other lens system, a dispersing system between said two lens systems, a mirror disposed for swinging it in the way and out of the way of the light rays emerging from said light spot, said mirror lying in its position for use, which it occupies when the apparatus is to be used for autocollimation, between said dispersing system and one of said two lens systems and, by reflection, causing the light transmitted by the other of said two lens systems and said dispersing system once more to traverse said dispersing system and said other lens system, and a system of mirrors for regulating the ways which the light rays in said both cases of use of the apparatus take from said light spot to the place of said image, the position of said mirror system relative to the other members of the optical system and to said light spot and to the place of said image being such that said ways of light rays cross each other, one mirror of said mirror system serving for reflecting light rays only when the apparatus is to be used for autocollimation, said one mirror being adapted to influence only part of the light rays and lying at the place of crossing of said ways of light rays.

2. In an optical system for spectral apparatus which are to be used for single passage of light as well as for autocollimation, two lens systems adapted to produce of a light spot which coincides with the focal point of one of said lens systems an image coinciding with the focal point of the other lens system, a dispersing system between said two lens systems, a mirror disposed for swinging it in the way and out of the way of the light rays emerging from said light spot, said mirror lying in its position for use, which it occupies when the apparatus is to be used for autocollimation, between said dispersing system and one of said two lens systems and perpendicularly to the axis of the pencil of light rays transmitted by the other of said two lens systems and said dispersing system, and thus causing the light ray coinciding with said axis to be reflected in itself, and a system of mirrors for regulating the ways which the light rays in said both cases of use of the apparatus take from said light spot to the place of said image, the position of said mirrors relative to the other members of the optical system and to said light spot and to the place of said image being such that said ways of light rays cross each other, one mirror of said mirror system serving for reflecting light rays only when the apparatus is to be used for autocollimation, said one mirror being adapted to influence only part of the light rays and lying at the place of crossing of said ways of light rays.

3. In an optical system according to claim 1, two slits for light entrance adapted to receive light when the apparatus is to be used for single light passage or for autocollimation, respectively, one of said two slits lying in the focal plane of one of said two lens systems and the other slit lying in the focal plane of the other lens system.

GERHARD HANSEN.